United States Patent [19]

Hamling

[11] Patent Number: 5,648,798
[45] Date of Patent: Jul. 15, 1997

[54] UNIVERSAL ERGONOMIC COMPUTER MOUSE/TRACKBALL

[76] Inventor: Daniel T. Hamling, 5036 Bela Dr., San Jose, Calif. 95129

[21] Appl. No.: 387,405

[22] Filed: Feb. 13, 1995

[51] Int. Cl.$^6$ .................................................. G09G 5/08
[52] U.S. Cl. ............................................ 345/163; 345/167
[58] Field of Search ........................... 345/163, 167, 345/169, 161; D14/100, 107, 114

[56] References Cited

U.S. PATENT DOCUMENTS

| | | | |
|---|---|---|---|
| 4,860,165 | 8/1989 | Gart | 345/163 |
| 5,157,381 | 10/1992 | Cheng | 340/710 |
| 5,280,276 | 1/1994 | Kwog | 345/167 |
| 5,287,090 | 2/1994 | Grant | 345/163 |
| 5,355,147 | 10/1994 | Lear | 345/163 |
| 5,428,368 | 6/1995 | Grant | 345/163 |

*Primary Examiner*—Regina D. Liang

[57] ABSTRACT

The present invention, functioning as either a mouse, trackball, or combination of both, allows the user to achieve a truly neutral operating position. This positioning, preferred by occupational therapists, forms the basis of the numerous ergonomic advantages of the invention. The invention permits neutral positioning by providing a formed hand support pad on top of a lower housing on which the side of the user's hand rests. Thus the invention is passively held by the weight of the user's hand and may be moved across the work surface without the constant stress of holding the device. An adjustable upper housing, mounted on the lower housing, is shaped and positioned to fit comfortably within the vertical palm of the user's hand. The upper housing contains the mouse buttons and trackball and is adjustable about an axis perpendicular to the work surface to allow use of the invention by right and left hand users having a variety of hand sizes. The design and position of the upper housing also provides a place for the thumb to comfortably rest. Finally, operation of the buttons and trackball require only the natural flexing or squeezing motion of the fingers and thumb.

6 Claims, 7 Drawing Sheets

UNIVERSAL ERGONOMIC COMPUTER MOUSE/TRACKBALL

FIELD OF INVENTION

The present invention relates generally to computer input devices and specifically to a new computer mouse and/or trackball that can accommodate right and left handed users of nearly all sizes and is operated using only optimal hand, wrist, and arm movements and positions.

BACKGROUND OF INVENTION

The importance and usage of the computer mouse and trackball input devices have become nearly equivalent to that of the computer keyboard itself. With the popularity of electronic design tools, graphical user interfaces, and even computer games, at least one or both of these input devices have now become standard equipment assumed to be attached to every computer. In fact, research directed by Peter W. Johnson of University of California Berkeley/San Francisco Ergonomics Lab indicates that mouse usage occupies one to two-thirds of one's working time on a computer. Early mouse and trackball designers, however, did not contemplate the adverse physical affects of this prolonged and repetitive use of their devices. Neither did they design their products to accommodate the reality of users having widely varying hand sizes and a preferred hand with which they operate the device.

Specifically in the case of the computer mouse, there are numerous design flaws that can lead to a variety of repetitive stress disorders such as the widespread carpal tunnel syndrome (CTS). For example, even the latest "ergonomic" designs demand a hand, wrist and arm position significantly inferior to the preferred neutral position (i.e. with the palm surface vertical). These designs also make the user susceptible to unnatural lateral, instead of flexing, wrist movements to control the cursor position. Further, the user must constantly be grasping the mouse with at least two fingers when moving the cursor or even actuating the mouse buttons, adding further fatigue. All designs, too, tend to forget about the thumb which is usually left to be dragged back and forth across the work surface or under the stress of constantly being held clear of the surface by the user. Actuating the mouse buttons causes additional stress since they are usually placed in such a way as to require the unnatural movement of the user's fingers in a direction away from the thumb. Though many devices boast universality, few can comfortably accommodate both left and right handed users and more than a narrow range of hand sizes. Finally, the devices are typically made of hard plastic causing further discomfort. Note, that many of these same design shortcomings also exist with the trackball devices presently available.

Thus, as the computer mouse and track ball continue to be heavily used in record numbers of homes and businesses, there is a great need to make a paradigm shield from the conventional mouse/trackball design to an input device design that is truly ergonomic and universal, yet has all the control and functionality to which computer users have grown accustomed.

SUMMARY OF INVENTION

The present invention represents a new paradigm in computer input devices for cursor control designed to satisfy the ergonomic needs of the computer user while maintaining state of the art functionality.

In particular, the present invention, functioning as either a mouse, trackball, or combination of both, allows the user to achieve a truly neutral operating position by providing a formed hand support pad on top of a lower housing on which rests the side of the user's hand opposite the thumb. The neutral positioning, preferred by occupational therapists, forms the basis of the numerous ergonomic advantages of the invention, such as elimination of unnatural lateral wrist movements. With the side of the hand comfortably resting on the support pad and thus the lower housing, the invention is passively held by the weight of the user's hand and may be moved across the work surface without the constant stress of holding the device.

An adjustable upper housing, mounted on the lower housing, is shaped and positioned to fit comfortably within the vertical palm of the user's hand. This upper housing contains the mouse buttons and/or trackball and is adjustable about an axis perpendicular to the work surface to allow use of the invention by right and left hand users having a variety of hand sizes. The design and position of the upper housing also provides a place for the thumb to comfortably rest. Also, operation of the buttons and/or trackball require only the natural flexing or squeezing motion of the fingers and thumb.

When configured as a mouse only, a roller ball projects through an opening in the bottom surface of the lower housing to make contact with the work surface. The movement of the roller ball as the entire invention is moved, is sensed and translated into electrical signals that are sent to the computer to control the position of the cursor. The upper housing typically contains three vertically aligned buttons to perform various mouse functions (e.g. selecting an item). The rotational adjustment feature of the upper housing is most useful in mouse mode since it allows placement of the buttons in the most comfortable position relative to the user's fingers. When the upper housing is rotated past the points at which the buttons are effectively parallel to the user's palm, the signals from the roller ball sensors are swapped appropriately to switch between right and left hand use. Since the buttons are aligned vertically, their function remains the same for both right and left hand users. An additional button may also be placed where the thumb is positioned to provided additional stress relieving single click functions such as a cursor centering, cursor speed adjust, double click equivalent, or hold and drag equivalent.

When configured as a trackball, a track ball now resides in the upper housing opposite the buttons near the user's thumb. The bottom surface of the lower housing no longer features an opening and a roller ball but is flat with a frictional coefficient appropriate for maintaining easy control of the device. The upper housing can still rotate for maximum comfort and preferred operating hand, but swapping of sensor signals is no longer needed due to the relative symmetry of the track ball and buttons.

When configured as a combination mouse and trackball, the invention contains all of the aforementioned features along with a two position toggle switch on the side of the lower housing. In the first position, mouse mode is selected which enables the bottom roller ball sensors and disables the thumb track ball sensors. In the second position, trackball mode is selected which enables the thumb track ball sensors and disables the bottom roller ball sensors.

BRIEF DESCRIPTION OF THE DRAWINGS OF INVENTION

DETAILED DESCRIPTION OF THE PREFERRED EMBODIMENT OF INVENTION

Figure 1:
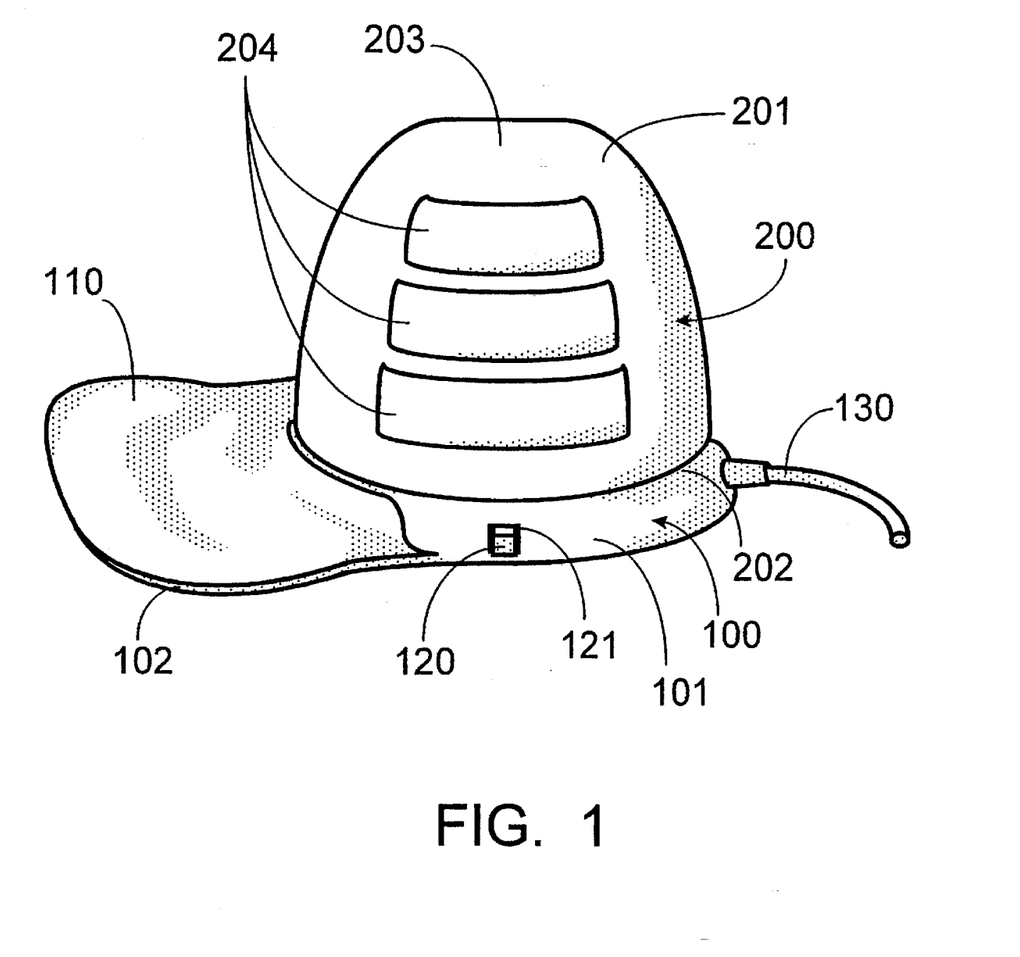
FIG. 1 illustrates a perspective view of the combined mouse and trackball of the present invention.

FIG. 1 illustrates a perspective view of the preferred embodiment of the present invention. The invention includes a lower housing 100 having a hollow shell portion 101 and a flat support platform portion 102. A formed hand support pad 110 upon which the side of the user's hand will rest is mounted on platform portion 102. A toggle switch 120 for switching between mouse and trackball modes extends through switch opening 121 in shell portion 101. Extending from the side of shell portion 101 opposite platform portion 102 is an electrical connection line 130 which is connected to a computer (not shown) to provide a means for transmission of electrical signals for communication of cursor movements and related functions initiated by the invention.

Figure 2:
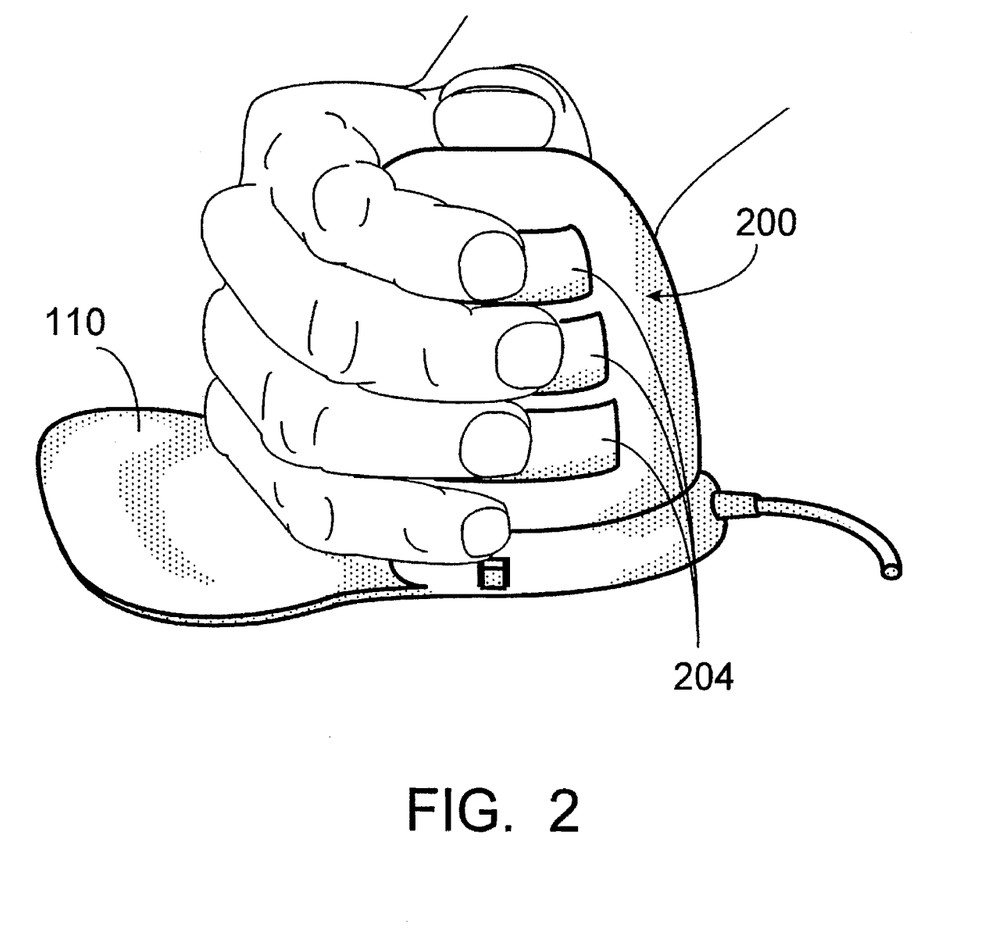
FIG. 2 illustrates operation of the present invention by a right-handed user.

Mounted on top of lower housing 100 is an upper housing 200. Upper housing 200 is substantially vertical and dome-shaped having sides 201 rising upwardly and inwardly from a annular bottom edge 202 to a flattened top surface 203. The position of upper housing 200 relative to lower housing 100 is adjustable via rotation about an axis through the center of and normal to bottom edge 202. Such rotation will allow more comfortable use of the invention by users having a widely varying hand sizes and a preferred hand with which they operate the device. Upper housing 200 also includes three function buttons 204 which are vertically aligned along side 201. Thus, with the side of a user's hand, for example a right handed user as shown in FIG. 2, resting in the neutral position on support pad 110, the shape and positioning of upper housing 200 comfortably aligns the fingers of the hand with the three buttons 204. This hand and finger positioning shown in FIG. 2 is the most significant advantage of the invention as it is ideal for reducing the repetitive stress injuries associated with mouse and trackball usage. For example, the positioning shown permits the user to actuate buttons 204 via the natural flexing motion of the fingers unlike the stressful actuation motion demanded of existing devices.

Figure 3:
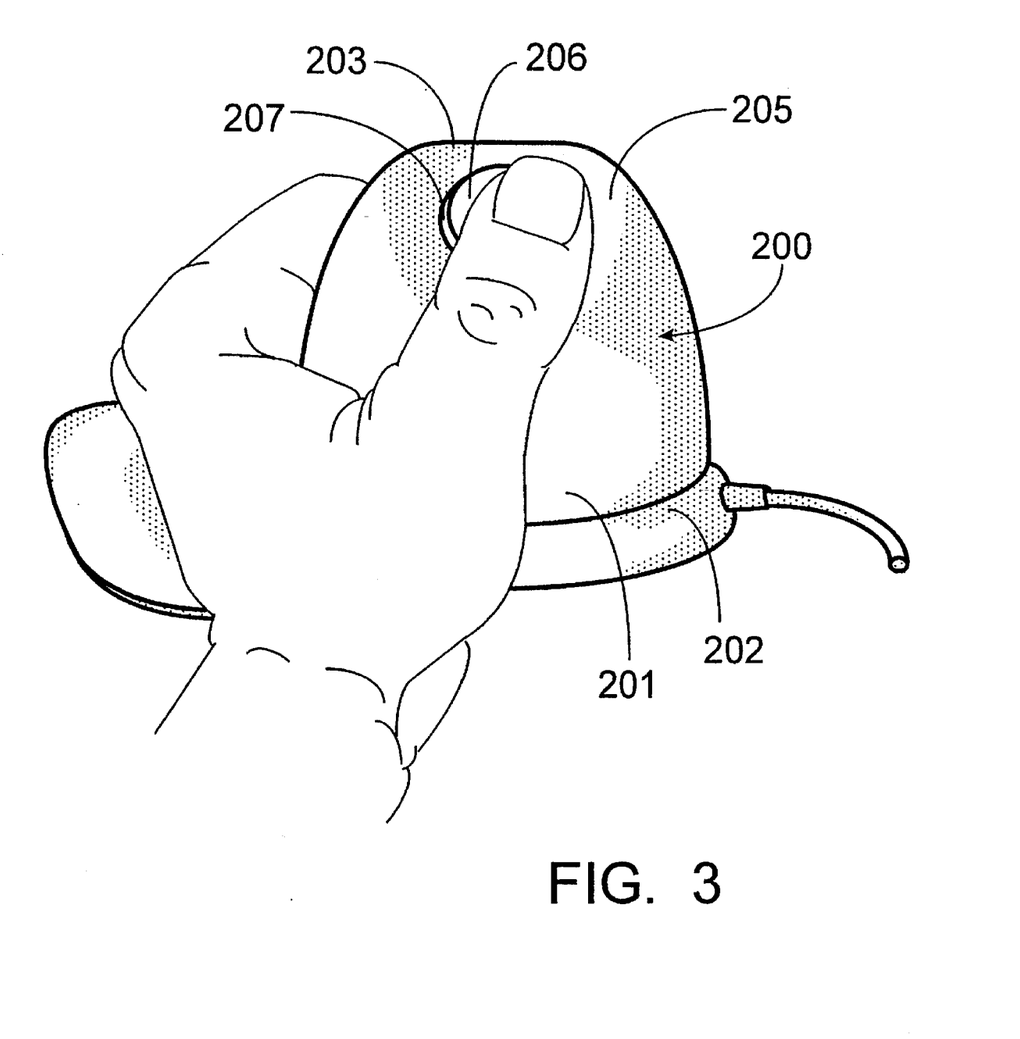
FIG. 3 illustrates operation of the present invention by a left-handed user.

Referring now to FIG. 3, upper housing 200 is shown rotated 180 degrees from that shown in FIG. 1 and FIG. 2 to accommodate a left handed user. This view of upper housing 200 illustrates a flat sloped surface 205 extending from top surface 203 downwardly and outwardly to intersect with side 201 near bottom edge 202. A track ball 206 extends through a track ball opening 207 defined in sloped surface 205. Track ball 206 is positioned to be accessible by the user's thumb and its movement is coupled to the computer cursor movement when the invention is in trackball mode. The area of sloped surface 205 generally provides the advantage of a convenient resting place for the thumb when using the invention.

Figure 4:
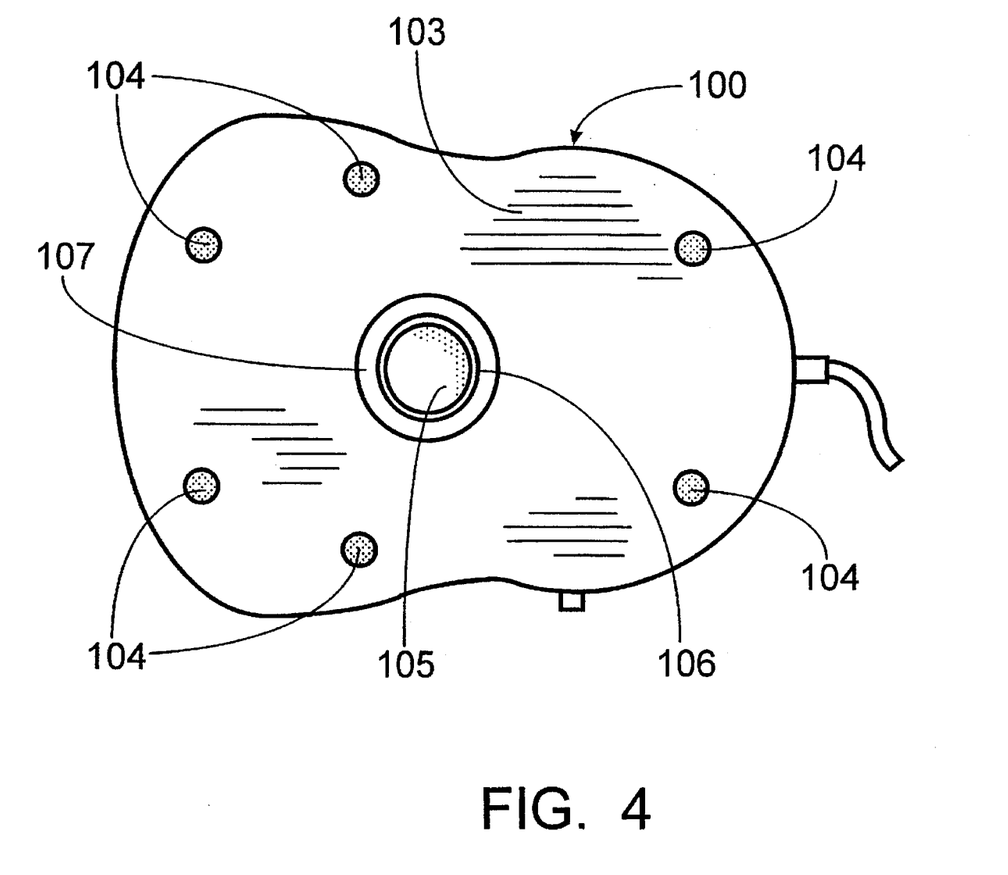
FIG. 4 illustrates a bottom view of the present invention.

FIG. 4 illustrates the bottom view of the invention which shows a bottom surface 103 of lower housing 100 to which six skid pads 104 are attached to minimize friction between the invention and work surface. A roller ball 105 protrudes through a roller ball opening 106 in bottom surface 103. Roller ball 105 is kept from falling through opening 106 by a circular plug 107 that fastens to bottom surface 103. Movement of roller ball 105 is coupled to the computer cursor movement when the invention is in mouse mode.

Figure 5:
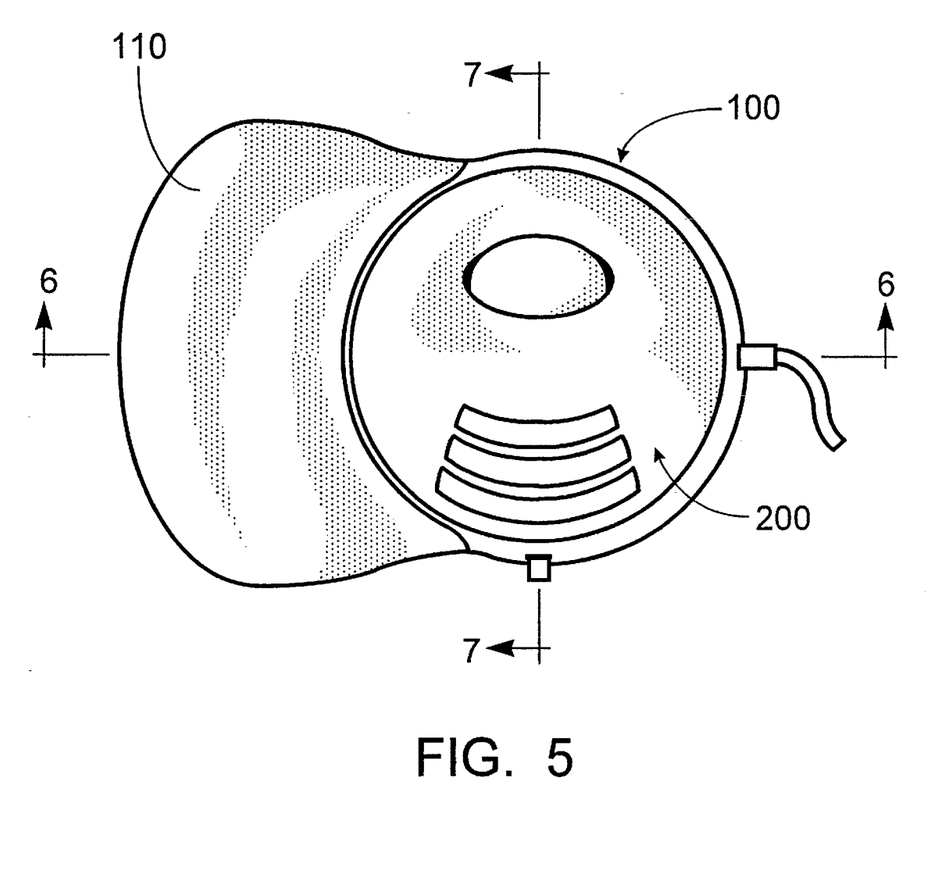
FIG. 5 illustrates a top view of the present invention.

FIG. 5 provides a top view of the present invention. This view is useful for showing the annular design of upper housing 200 to better appreciate how upper housing 200 may be rotated to adjust for varying user hand sizes. Also, the size of support pad 110 relative to lower housing 100 is illustrated clearly. Note, too, the orientation and direction of the lines on which subsequent cross sectional views were taken.

Figure 6:
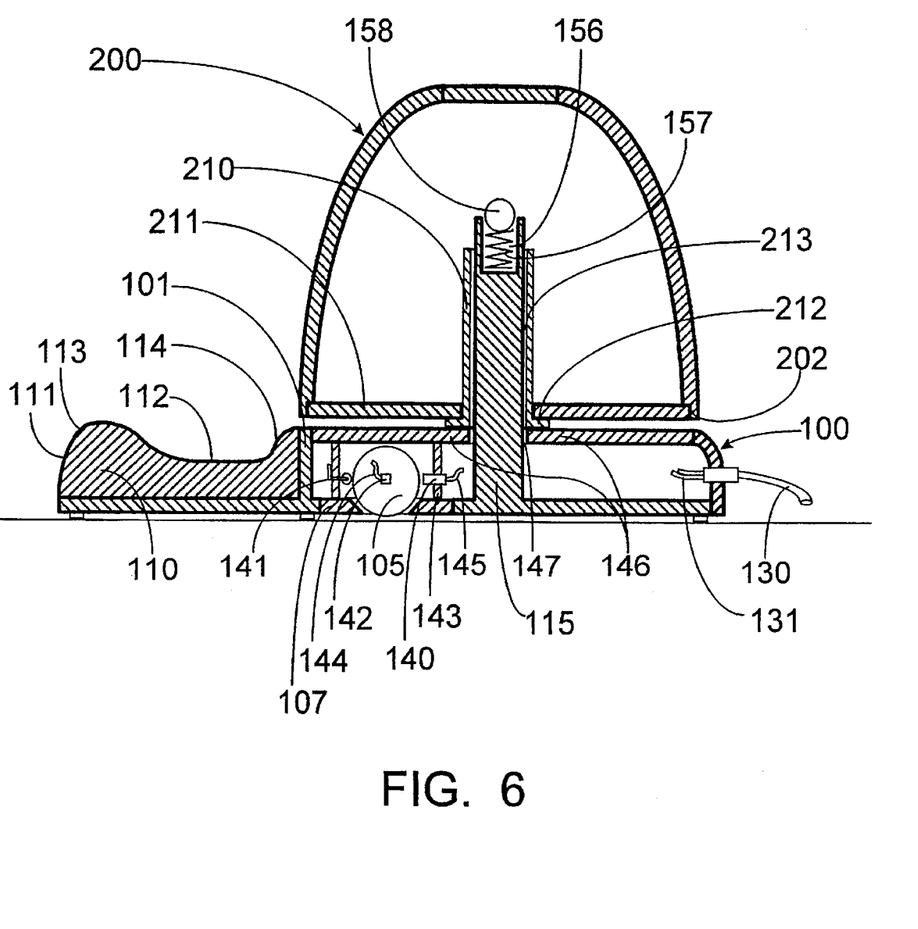
FIG. 6 illustrates a cross-sectional view along line 6—6 of FIG. 5.

FIG. 6 shows a cross sectional view taken on line 6—6 of FIG. 5. This view shows support pad 110 having an outside edge 111 sloping upwardly and inwardly until joining a concave portion 112 at a rounded peak 113. The inner slope 114 of concave portion 112 rounds off to a peak where it joins shell portion 101 of lower housing 100. Support pad 110 is thus shaped to hold the side of the user's hand to couple movement of the hand with movement of the entire invention. Support pad 110 is also made of a soft foam material to further the comfort of the user.

Roller ball 105 is shown residing in an annular lower ball housing 140 within lower housing 100. Roller ball 105 is held within lower ball housing 140 by plug 107. Lower ball housing 140 contains a lower tension roller 141, and lower ball sensors 142 and 143. Lower tension roller 141 holds roller ball 105 firmly in contact with lower sensors 142 and 143 without restricting the movement of roller ball 105. Lower ball sensors 142 and 143 engage roller ball 105 at positions 90 degrees apart about the equator of ball 105. Lower ball sensors 142 and 143 are electromechanical sensors that pick up the movement of roller ball 105 and translate the movement into electrical pulses. These pulses are sent through lower sensor wires 144 and 145 to a circular lower circuit board 146 attached to shell portion 101 of lower housing 100. Lower circuit board 146 contains the signal processing means which takes the signals from sensors 142 and 143 as well as other sensors within the invention (described later) and converts them to signals the computer will understand. The processed computer signals are sent from lower circuit board 146 through communication wires 131 and out through electrical connection line 130.

A cylindrical pivot shaft 115 attached to the inside center of shell portion 101 protrudes through a lower board aperture 147 in board 146. At the top of pivot shaft 115 is a recessed cup portion 156 holding a spring 157 and a tension ball 158 as shown in FIG. 6. Spring 157 and ball 158 are used to support the tracking ball of the invention as described later. Surrounding but not attached to pivot shaft 115 is a cylindrical pivot sleeve 210. Pivot sleeve 210 is attached to a circular upper circuit board 211 which in turn is attached to bottom edge 202 of upper housing 200. This configuration allows upper housing 200 and all attached components to be placed on pivot shaft 115 of lower housing 100 while allowing upper housing 200 to be rotated about pivot shaft 115. Sleeve 210 also has a flange 212 near an upper board aperture 213 in upper circuit board 211 through which sleeve 210 protrudes. Flange 212 provides the means for attachment of sleeve 210 to circuit board 211 as well as the means for providing a fixed spacing between upper circuit board 211 and lower circuit board 146.

Figure 7:
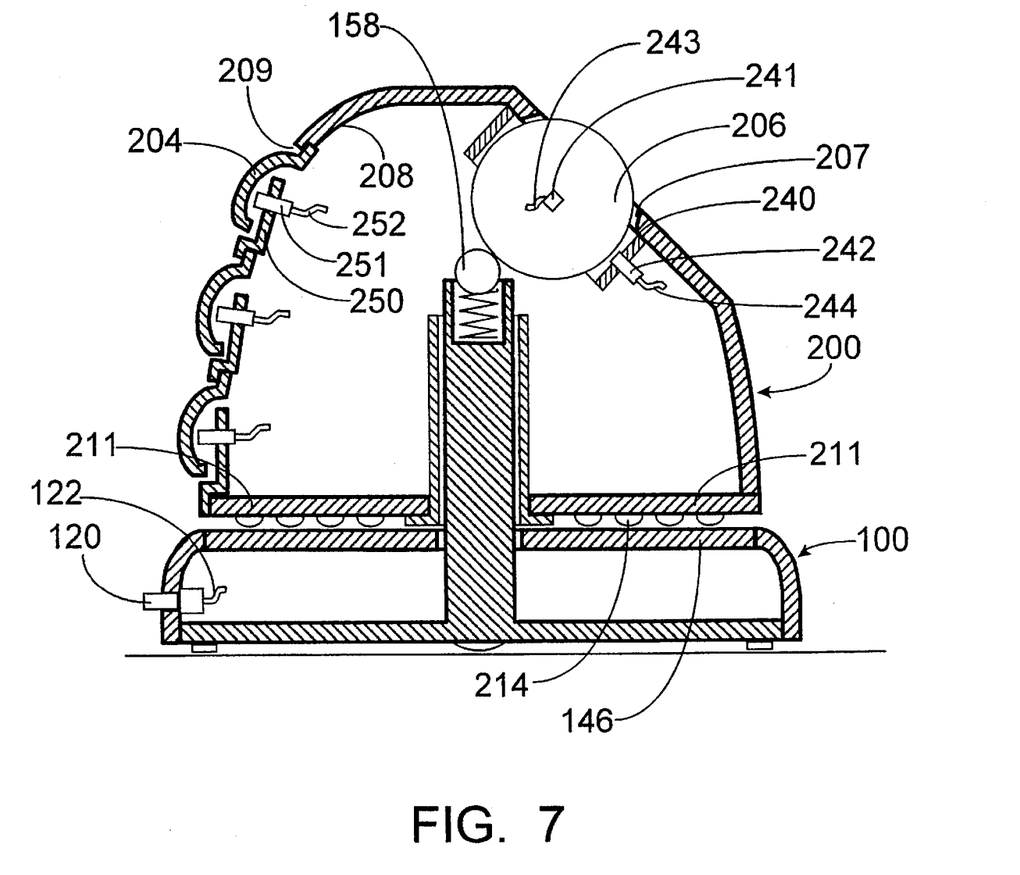
FIG. 7 illustrates a cross-sectional view along line 7—7 of FIG. 5.

Referring now to FIG. 7 for more details, this cross sectional view along line 7—7 of FIG. 5 shows track ball 206 within an upper ball housing 240. Tension ball 158 makes contact with track ball 206 forcing it to protrude through track ball opening 207 to be available to the user while still enabling track ball 206 to move freely and easily. Upper ball sensors 241 and 242 engage track ball 206 at positions 90 degrees apart about the equator of ball 206. Upper ball sensors 241 and 242 are electromechanical sensors that pick up the movement of track ball 206 and translate the movement into electrical pulses. These pulses are sent through upper sensor wires 243 and 244 to upper circuit board 211.

On the side of upper housing 200 opposite track ball 206, buttons 204 are shown in cross section. Buttons 204 are attached to the inside surface 208 of upper housing 200 and protrude through three button openings 209 in upper housing 200 to be available to the user of the invention. Three sensor plates 250 behind each button 204 are attached to upper housing 200 and hold three button sensors 251, one for each plate 250. Button sensors 251 are electromechanical sensors that detect the movement of buttons 204 and translate the movement into electrical signals. These signals are sent through button sensor wires 252 to upper circuit board 211. Electrical signals are passed from upper circuit board 211 to lower circuit board 146 via at least five (one for each sensor in upper housing 200) conductive contact bumps 214. Contact bumps 214 provide a low resistance electrical connection between circuit boards 146 and 211 by being mechanically and electrically attached to one of the boards while maintaining electrical contact with the surface plating of the other board. This configuration provides the means for maintaining electrical contact between circuit boards 146 and 211 while upper housing 200 and all its attached components are being rotated with respect to lower housing 100. Proper design of the surface plating of circuit boards 146 and 211 can also provide a means for the switching of various electrical signals as upper housing 200 is rotated.

Finally, toggle switch 120 is shown attached to lower housing 100. The position of toggle switch 120 is translated into an electrical open or short that is carried to lower circuit board 146 by switch wires 122. Again, toggle switch 120 is used to switch between mouse and trackball modes by appropriately enabling either sensors 142 and 143, or sensors 241 and 242.

While the description above of the present invention contains many specificities, these should not be construed as limitations on the scope of the invention, but rather as an exemplification of one preferred embodiment thereof. Accordingly, other modifications and variations may be possible in light of the above teachings. The embodiment above was chosen and described in order to best explain the principles of the invention and its practical application to thereby enable others skilled in the art to best utilize the invention in various embodiments and various modifications as are suited to the particular use contemplated. The appended claims and their legal equivalents are intended to determine the scope of the present invention which may include other alternative embodiments except insofar as limited by the prior art.

What is claimed is:

1. An electronic input device comprising:
   a housing, wherein said housing has an upper portion and a lower portion and the sides of said housing are substantially vertical,
   a mounting means, wherein said mounting means is disposed to rotatably support said upper portion on top of said lower portion,
   a roller ball rotatably mounted in said lower portion, wherein said roller ball protrudes through an opening in said lower portion,
   at least one button extending substantially horizontally along the side of said upper portion,
   a first sensing means coupled to said roller ball, wherein said first sensing means translates movement of said roller ball into a first set of communication signals, and
   a second sensing means coupled to said at least one button, wherein said second sensing means translates activation of said at least one button into a second set of communication signals; and
   said housing being shaped to fit comfortably in the natural curvature of a user's right or left hand with the user's palm in close proximity to the side of said housing such that the palm is substantially vertical, said at least one button being accessible to at least one finger or thumb of the user's hand, and said upper portion being rotatable with respect to said lower portion along an axis substantially parallel to the user's palm to position said at least one button according to the needs of the user.

2. The input device according to claim 1, wherein a support platform is attached adjacent to said lower portion, and said support platform is shaped to support the side of the user's hand opposite the thumb.

3. An electronic input device comprising:
   a housing, wherein said housing has an upper portion and a lower portion and the sides of said housing are substantially vertical,
   a mounting means, wherein said mounting means is disposed to rotatably support said upper portion on top of said lower portion,
   a tracking ball rotatably mounted in said upper portion, wherein said tracking ball protrudes through an opening in said upper portion,
   at least one button extending substantially horizontally along the side of said upper portion,
   a first sensing means coupled to said tracking ball, wherein said first sensing means translates movement of said tracking ball into a first set of communication signals, and
   a second sensing means coupled to said at least one button, wherein said second sensing means translates activation of said at least one button into a second set of communication signals; and
   said housing being shaped to fit comfortably in the natural curvature of a user's right or left hand with the user's palm in close proximity to the side of said housing such that the palm is substantially vertical, said tracking ball being accessible to at least one finger or thumb of the user's hand, said at least one button being accessible to at least one finger or thumb of the user's hand, and said upper portion being rotatable with respect to said lower portion along an axis substantially parallel to the user's palm to position said at least one button and said tracking ball according to the needs of the user.

4. The input device according to claim 3, wherein a support platform is attached adjacent to said lower portion, and said support platform is shaped to support the side of the user's hand opposite the thumb.

5. An electronic input device comprising:
   a housing, wherein said housing has an upper portion and a lower portion and the sides of said housing are substantially vertical,
   a mounting means, wherein said mounting means is disposed to rotatably support said upper portion on top of said lower portion,
   a roller ball rotatably mounted in said lower portion, wherein said roller ball protrudes through an opening in said lower portion, a tracking ball rotatably mounted in said upper portion, wherein said tracking ball protrudes through an opening in said upper portion, at least one button extending substantially horizontally along the side of said upper portion, a first sensing means coupled to said roller ball, wherein said first sensing means translates movement of said roller ball into a first set of communication signals, a second sensing means coupled to said tracking ball, wherein said second sensing means translates rotation of said tracking ball into a second set of communication signals, and a third sensing means coupled to said at least one button, wherein said third sensing means translates activation of said at least one button into a third set of communication signals; and said housing being shaped to fit comfortably in the natural curvature of a user's right or left hand with the user's palm in close proximity to the side of said housing such that the palm is substantially vertical, said tracking ball being accessible to at least one finger or thumb of the user's hand, said at least one button being accessible to at least one finger or thumb of the user's hand, and said upper portion being rotatable with respect to said lower portion along an axis substantially parallel to the user's palm to position said at least one button and said tracking ball according to the needs of the user.

6. The input device according to claim 5, wherein a support platform is attached adjacent to said lower portion, and said support platform is shaped to support the side of the user's hand opposite the thumb.

* * * * *